United States Patent
Tjernberg

(10) Patent No.: US 11,601,454 B2
(45) Date of Patent: Mar. 7, 2023

(54) WORK MACHINE AND METHOD FOR MONITORING A CONTROL SYSTEM AT A WORK MACHINE

(71) Applicant: Komatsu Forest AB, Umeå (SE)

(72) Inventor: Fredrik Tjernberg, Holmsund (SE)

(73) Assignee: Komatsu Forest AB, Umeå (SE)

( * ) Notice: Subject to any disclaimer, the term of this patent is extended or adjusted under 35 U.S.C. 154(b) by 337 days.

(21) Appl. No.: 16/760,830

(22) PCT Filed: Dec. 12, 2018

(86) PCT No.: PCT/SE2018/051299
§ 371 (c)(1),
(2) Date: Apr. 30, 2020

(87) PCT Pub. No.: WO2019/125281
PCT Pub. Date: Jun. 27, 2019

(65) Prior Publication Data
US 2020/0358797 A1    Nov. 12, 2020

(30) Foreign Application Priority Data
Dec. 18, 2017    (SE) .................................. 1751567-7

(51) Int. Cl.
*H04L 9/40*    (2022.01)
*H04W 4/80*    (2018.01)
(Continued)

(52) U.S. Cl.
CPC ........ *H04L 63/1425* (2013.01); *G06F 9/3005* (2013.01); *G06F 9/544* (2013.01);
(Continued)

(58) Field of Classification Search
None
See application file for complete search history.

(56) References Cited

U.S. PATENT DOCUMENTS

| | | | | |
|---|---|---|---|---|
| 4,633,461 A | * | 12/1986 | Banton | .............. H04Q 11/0407 370/384 |
| 5,095,417 A | * | 3/1992 | Hagiwara | ............. H04L 12/423 340/3.54 |

(Continued)

FOREIGN PATENT DOCUMENTS

| | | |
|---|---|---|
| DE | 10043409 A1 | 4/2001 |
| EP | 1616746 A2 | 1/2006 |

(Continued)

OTHER PUBLICATIONS

International Search Report for PCT Patent Application No. PCT/SE2018/051299, dated Jul. 12, 2018, 4 pages.

(Continued)

*Primary Examiner* — Nicholas Sloms
(74) *Attorney, Agent, or Firm* — Morrison & Foerster LLP

(57) ABSTRACT

The invention relates to a work machine and a method for monitoring a control system at a work machine (1*a*). According to the method, in-parameters (32, 34, 36, 38) are obtained in the form of signals from the control system, wherein the control system generates actual values on one or more out-parameters (42, 44) in the form of signals based on said in-parameters. A characteristic of the invention is that a digital flow of data, comprising both said in-parameters and out-parameters via a control bus (5*a*, 5*b*), is addressed to a RAM buffer memory (3*b*,3*c*), which is included in a personal computer (3*a*) onboard the work machine, which buffer memory in FIFO mode writes a data file (id:1.1-id1:n) of a predetermined size, which is saved in a non-volatile data support memory (3*d*).

20 Claims, 3 Drawing Sheets

(51) Int. Cl.
*G06F 9/30* (2018.01)
*G06F 9/54* (2006.01)
*H04L 12/40* (2006.01)

(52) U.S. Cl.
CPC .............. *H04L 12/40* (2013.01); *H04W 4/80* (2018.02); *H04L 2012/40215* (2013.01)

(56) References Cited

U.S. PATENT DOCUMENTS

| | | | | |
|---|---|---|---|---|
| 5,170,338 | A * | 12/1992 | Moritoki | H04L 12/423 714/717 |
| 5,502,822 | A * | 3/1996 | Takebe | G06F 13/385 710/316 |
| 6,339,737 | B1 * | 1/2002 | Yoshimura | G07C 5/085 701/50 |
| 6,349,252 | B1 * | 2/2002 | Imanishi | G08C 15/06 701/32.7 |
| 6,856,879 | B2 * | 2/2005 | Arakawa | E02F 9/267 701/34.2 |
| 7,786,996 | B2 * | 8/2010 | Unger | H04N 21/426 710/72 |
| 8,533,018 | B2 * | 9/2013 | Miwa | G06Q 10/06 705/305 |
| 2002/0046048 | A1 * | 4/2002 | Fukushima | G05B 23/0283 709/223 |
| 2003/0050747 | A1 | 3/2003 | Kamiya | |
| 2003/0216889 | A1 | 11/2003 | Marko et al. | |
| 2005/0015624 | A1 * | 1/2005 | Ginter | H04L 63/145 726/4 |
| 2010/0228423 | A1 | 9/2010 | Howell et al. | |
| 2013/0295859 | A1 * | 11/2013 | Parent | H04W 4/70 455/73 |
| 2017/0092018 | A1 | 3/2017 | Throop et al. | |
| 2017/0249788 | A1 | 8/2017 | Remboski et al. | |
| 2017/0364652 | A1 * | 12/2017 | Lo Priore | G16H 10/40 |
| 2019/0129690 | A1 * | 5/2019 | Anderson | E02F 9/262 |

FOREIGN PATENT DOCUMENTS

| | | |
|---|---|---|
| EP | 1923289 A2 | 5/2008 |
| EP | 2230502 A1 | 9/2010 |
| WO | 2005/068262 A1 | 7/2005 |
| WO | WO-2013053977 A1 * | 4/2013 ............. E21F 17/18 |

OTHER PUBLICATIONS

Extended European Search Report received for European Patent Application No. 18893093.7 dated Aug. 6, 2021, 9 pages.

* cited by examiner

WORK MACHINE AND METHOD FOR MONITORING A CONTROL SYSTEM AT A WORK MACHINE

CROSS REFERENCE TO RELATED APPLICATIONS

This application is a national stage application under 35 U.S.C. § 371 of International Application No. PCT/SE2018/051299, filed internationally on Dec. 12, 2018, which claims priority to SE 1751567-7, filed Dec. 18, 2017, the disclosures of which are herein incorporated by reference in their entirety.

TECHNICAL FIELD OF THE INVENTION

The present invention relates to a method for monitoring a control system at a work machine according to the preamble of claim 1. The invention also relates to a work machine, specifically a forest machine, according to the preamble of claim 14.

BACKGROUND OF THE INVENTION

Work machines such as forest machines are high-technology products, which are equipped with complex control systems to enable managing and controlling a number of various functions. In the following, the term work machine, in addition to forest machines, also refers to agricultural machines, construction machines, such as loaders or excavators.

In the various machine units of the work machine, control units are used for checking and controlling said machine units. At machine control level, these control units can exchange real time information and are connected with each other via one or more bus systems. The function of the control units is determined by programs or software stored in a memory in a control unit (also PLC controls), in which said memory may, but does not necessarily need to be programmable. Modern work machines can contain hundreds of various electronic control units, including large microprocessor CPU-based units, for example so-called ECUs (Electronic Control Unit). Each ECU is in turn cable-connected or wirelessly connected to components in the work machine, such as one or more sensors and/or actuators. Such an ECU then receives in-parameters, i.e. signals or input data from several smaller control units, such as sensors, and sends back out-parameters data, i.e. output data, control signals or control data to several actuators. This type of data is usually designated I/O. I/O is an abbreviation for Input/Output and describes the data flow that takes place through various interfaces in a control bus network.

In work machines and similar vehicles, communication takes place between said control units via various types of data networks, wherein CAN bus (Controller Area Network) or similar high-speed data communication protocols are most common. By means of these networks, CPU control units, sensors and execution means (actuators) can communicate. This communication also makes it possible to update software and perform error search and diagnosing.

The operating state of this complex control system may need to be monitored for analysis, i.e. to diagnose and/or predict errors in the control systems. A number of various techniques and devices have been developed for diagnosing control systems, primarily with regard to engines and engine control systems, including expert systems and various mathematical models, such as neural networks with self-learning algorithms.

Common for said monitoring technologies is that they require a certain critical data volume on which to perform the analysis. Through processing of collected data a monitoring system can be used partly for diagnosing and hence identifying an initial error source after the error has occurred and partly as a prognostic system for identifying an initial error source before the error has occurred.

Forest machines as well as a number of other types of work machines usually have a computer or a PC-based on-board system with programs or applications for various purposes, specifically for management of operating production or process data for the work machine. In the following, operating production or process data relate to data that are usually separated from the machine control data of the control system insofar as said operating data substantially concern the operating functions and efficiency of the work machine. This could for example concern measurement data for the calculation of production optimization of the work machine operation, calculation as well as monitoring and storage of production data.

Although modern electronics ensures high operational reliability, unplanned stoppage may nevertheless occur, for example because some machine function in the control system stops working entirely or that it no longer works in the intended way. Error search in case of unplanned stoppage may be both difficult and time-consuming.

Moreover, questions may arise about guarantee commitments and whether the work machine is used correctly, alternatively if the work machine is in any way manipulated by users. In error search it can also be advantageous to be able to control, in a simple manner, whether a previous exchange of a component, for example a hydraulic control valve, actually solved a previous problem.

In practice, however, no means have so far been available to enable technicians to monitor and perform efficient error search of the control system of work machines. Ever so often error search will have to be performed in the field far away from the nearest service workshop and only based on an oral report from the driver or operator of the work machine. In some cases, on-board diagnostic techniques such as OBD or OBD-II or similar diagnostic tools offer information so that the problem in question can quickly be localized. As the control units constituent in the control system usually just make a noise in case of detected errors, and the content of the error information in a control system overall is limited as to both extent and content, as only parts of the control system overall are monitored, the material is in practice often insufficient as basis for the diagnostic work, and error search is even less useful as basis for prognostic purposes.

In other instances, a limited number of data files and isolated complied system logs of some critical main components of the work machine can serve as helpful support in diagnosing and localizing the error source. If the search relates to errors that only occur sporadically or randomly, the chance of a technician localizing an error source in a control system is smaller, as it is usually very difficult to actively try to provoke such errors.

To meet these requirements, various types of systems have so far been suggested, which can monitor certain specific functions and processes of a work machine continuously in real time by recording data from the work vehicle's control system at a monitoring level arranged in the control system via for example recording equipment on board the work machine. Prior art recording systems can basically be compared with a digital tachograph, wherein selected data logs for a limited number of main components and for a limited previous period of time for the work machine are stored. One problem with the prior art recording solutions for monitoring the control systems is thus that they are limited because they usually just include data for specific main components or functions which are considered critical, for example they may concern recorded signals with engine data. In this context, it should be mentioned that most advanced control units, i.e. primary nodes such as ECU, usually just send diagnostic error code data in the case of errors that trace the internal software of the control unit. Due to the limited amount of measurement data of known monitoring systems, it may therefore be difficult for a technician to efficiently diagnose or predict the occurrence of errors in the control systems and with good certainty localize each error source specifically, as these do not necessarily arise in a dedicated critical component.

OBJECT OF THE INVENTION

Thus, there is a need for improved methods and devices for monitoring control systems comprised in work machines and thus more efficiently be able to diagnose and/or prognosticate errors in the control system.

A first object of the present invention is therefore to provide a method, which in a simple manner makes it possible to monitor control systems more efficiently and thereby also diagnose and/or prognosticate errors in the control system of work machines.

In this regard, it may partly be about enabling real-time collection of large volumes of the data that a work machine generates and partly about enabling storage of these data for further analysis. To obtain access and hence knowledge of the way in which each specific work machine is used by collecting very large amounts of real-time data and for example store data in the cloud can contribute to adding value for both the machine manufactures and the customers. A customer who has many work machines can obtain a compiled overview of the function and production of the work machines. The aggregate data can also be used for providing a customer or a machine driver with information in real time, via an HMI (Human Machine Interface), such as a dialogue field in a monitor in the driver's cabin, for example suggestions for measures to improve the operating performance.

Another object of the invention is to provide a work machine, particularly a forest machine, which includes a monitoring system that is configured at a monitoring level to work according to the invention.

SUMMARY OF THE INVENTION

The insight that forms the basis of the invention is that the ability to more efficiently diagnose or prognosticate the occurrence of errors in a control system, which is included in a work machine, is facilitated if it is possible in a simple manner to provide a major statistical base of logged data. In this regard, it is about not just logging error codes that are outputted by separate control units, but also about collecting and recording a digital flow of all relevant I/O data, i.e. in-parameters and out-parameters from both advanced electronic control units (primary control units) to the individual sensors (secondary control units), which may occur in a control system.

By collecting large volumes of measurement data through monitoring and recording of all signals and conceivable states of the software i.e. I/O signals as well as the occurrence of logic signals, a statistical base of the required critical size can be obtained. The measurement data that are needed for each specific error search scenario are thus accessible and can be analysed subsequently when an error has occurred. A database that contains a comprehensive amount of operating and measurement data from the control system will enhance the possibility of not just localizing the occurrence of errors but also of prognostically predicting the need for measures to avoid the occurrence of errors and hence stoppage at varying operating conditions for work machines.

Accordingly, it is set forth;

that a plurality of in-parameters in the form of signals are obtained from the control system, whereby the control system generates actual value on one or more out-parameters in the form of signals based on said plurality of in-parameters, that a digital flow of data comprising both said in-parameters and out-parameters via a control bus or communication bus is addressed to a data area in a working memory or persistent memory, which is included in a PC on board the work machine, that a data file corresponding to the data area is periodically saved in a non-volatile data support memory on board the work machine or is via telecommunication transferred and saved in an external non-volatile data support memory.

In an alternative embodiment, a unique so-called log storage function, for example in the form of a timing marker by means of a clock, can be assigned to each initiated data file via a so-called logging means, before said respective data file is saved.

In another alternative embodiment of the invention, corresponding signals can be compared between at least one of said in-parameters or out-parameters between a previously respectively a subsequently created data file, so that any deviations can thereby be identified, whereby the required bandwidth can be reduced in that only signals that change, i.e. deviate relative to a previous control, are addressed to the personal computer's RAM buffer memory and are used for creating a sequence of data files, each of which represents a process image of the control unit.

In an alternative embodiment, a combination of the on-board data or PC of the work machine is used, both for handling of the work machine's operating production or process data and for recording and handling of in-parameters and out-parameters from the control system. This means that the work machine's on-board computer or PC is also utilized for collecting all external I/O (value and status) and record it in a buffer during operation. In addition, the state of the control logic in the form of logic signals can be recorded. In that part, it may concern the momentary states of units, calculated data and internal communication between function blocks in software.

In an embodiment, the control system sends logic signals at high frequency to the on-board computer. Optionally, the control system logic can control which signals have changed since a previous control and thereby reduce the required bandwidth by sending only the signals that have changed. The frequency should be variable, wherein it is preferred that signals can be sent in at least 100 Hz ($\geq 100$ Hz).

As said signals (in-parameters and out-parameters from nodes) are sent to a computer or PC on board, the same data source can be used for a number of various purposes, not just error search. By means of software or applications that are installed on the computer on board, e.g. advanced analyses of collected data can be performed in real time to provide a better decision basis for the driver about potential improvements in operating mode or settings in the machine. An example of a function could be warning the driver via a message on the monitor of the on-board computer if a pressure peak occurs in a hydraulic system comprised in the work machine at some point and via said monitor recommend that the driver changes a specific setting, which by comparison between the work machine's operating production and process data as well as in-parameters and out-parameters from the control system should reasonably result in a production increase. Not least for a less experienced machine driver, such information provided to the driver in real time could be extremely valuable.

BRIEF DESCRIPTION OF THE DRAWINGS

In the following, the invention is described in detail with reference to the accompanying drawings, wherein.

DETAILED DESCRIPTION OF THE INVENTION

Figure 1:
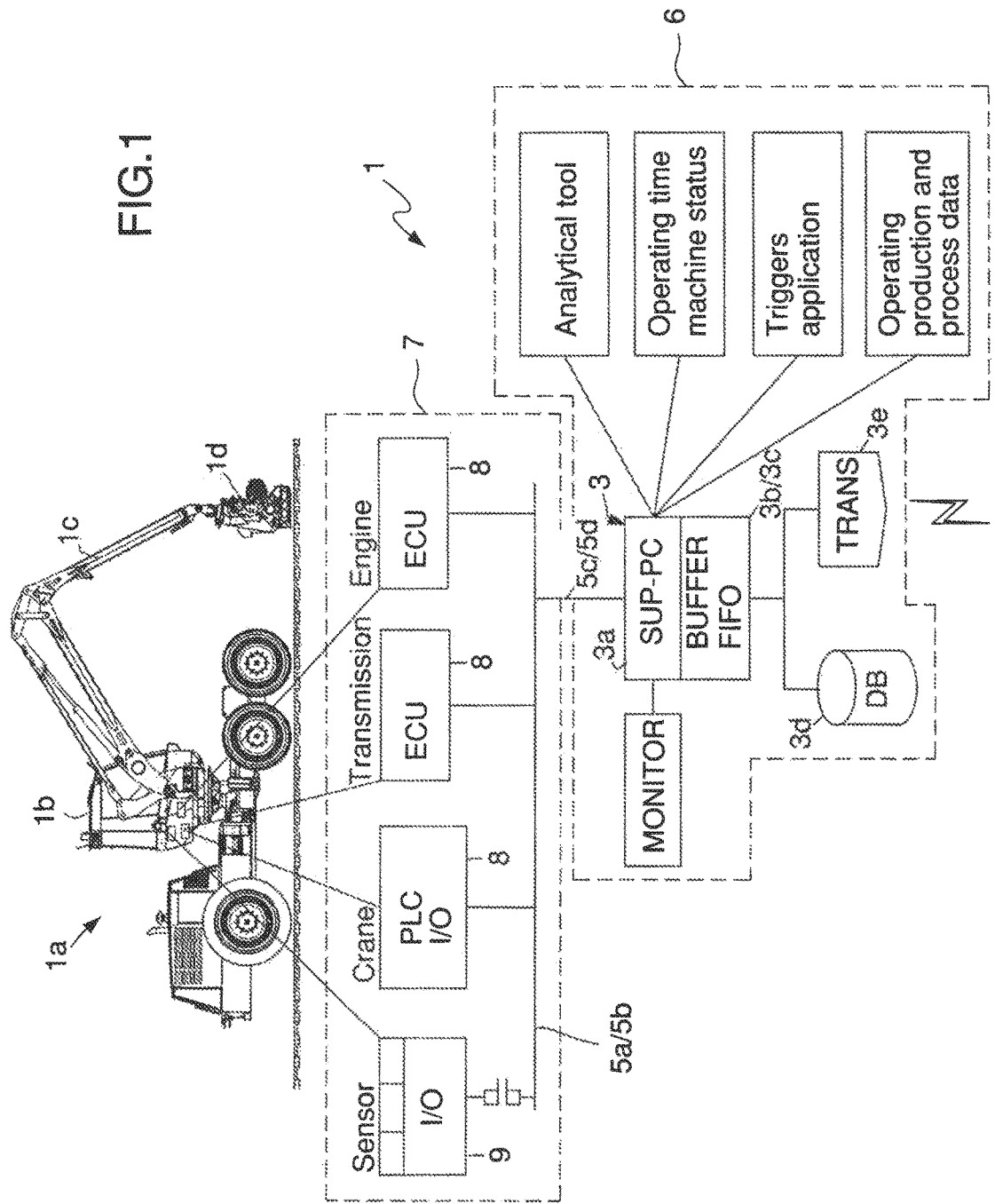
FIG. 1 shows schematically in a block diagram the units that are included in a system to monitor a control system in a work machine according to the present invention.

FIG. 1 schematically shows a work machine $1a$ with a system for monitoring a control system 1 constituent in the work machine at a monitoring level. The monitoring system makes it possible to collect and compare data, which can be used for diagnosing and/or prognosticating the occurrence of errors in the control system of the work machine. The work machine $1a$, here in the form of a forest machine such as a harvester, is equipped with a driver's cabin $1b$ and an operable crane jib $1c$, which in its free end carries a harvester aggregate $1d$. The work machine $1a$ is equipped with a control system 1, which according to the invention at a monitoring level comprises a monitoring unit 3. The control system 1 can comprise a control bus with a CAN bus-based computer network for communication between the primary control units (ECUs), which can control the engine, transmission etc., PLC control units, which can control the crane boom (crane jib) and enables the driver or operator to drive and use the forest machine in the intended way. At a lower level, the prior art control system can be equipped with a plurality of master-slave LIN bus-based networks for communication with secondary control units in the form of simpler units, such as sensors, actuators and sensing means.

The driver's cabin $1b$ of the work machine $1a$ is equipped with a computer SUP-PC $3a$ included in said monitoring unit 3 with an operator interface HMI (Human Machine Interface) between the driver and the machine, i.e. in practice the monitor and/or touch screen and which computer can be considered to be equivalent to a personal computer PC. As is known, the computer $3a$ can comprise a processor CPU unit, a RAM memory module, a database in the form of a non-volatile memory, in and out units to communicate with the computer as well as a network interface 4, in/out interface with a suitable network adapter for communication with a control system 1 at machine control level 7.

The computer $3a$ located on board the work machine $1a$ can contain software and an amount of various applications not just for monitoring but also for handling of operating production or process data for the work machine. This means to store production data, control and manage the various work functions of the work machine, for example to measure the thickness and length of a tree trunk as well as to handle felling, trimming and cutting up. The computer $3a$ may also contain applications, i.e. application programs or application software, which fulfill a direct purpose for the operating driver. In this case, it may concern computer programs that handle the production of the work machine $1a$ and thereto a database with complied information about the total production or productivity of the work machine. For example, it could be mentioned that the computer $3a$ of the work machine on command from a driver and by means of the sensor value I/O from sensors included in the hardware can calculate and suggest optimum preparation of the trees that are felled. In the harvest aggregate $1d$, the diameter of the trunk is measured either by means of the feed roller, or the spacing and length of the sprig knives are measured, usually by a spacing disc (not shown). In addition to said touch screen and computer 3, the driver's cabin $1b$ may be equipped with W-LAN and USB connections.

The computer $3a$ constituent in the monitoring unit 3 is in data-transmitting connection with machine control level 7 via a communication bus $5c$, $5d$, such as Ethernet or via direct coupling to the control bus. Sampled data from nodes 8, 9 can be addressed to the computer $3a$ via a communication bus and the central node or master 10. The central node or master 10 can collect and compile all I/O data from other units that are coupled to various control buses. The monitoring unit 3 thus constitutes a kind of monitoring level 6 of the control system 1. The monitoring unit 3 is also referred to as monitoring node 3 in the following.

Figure 2:
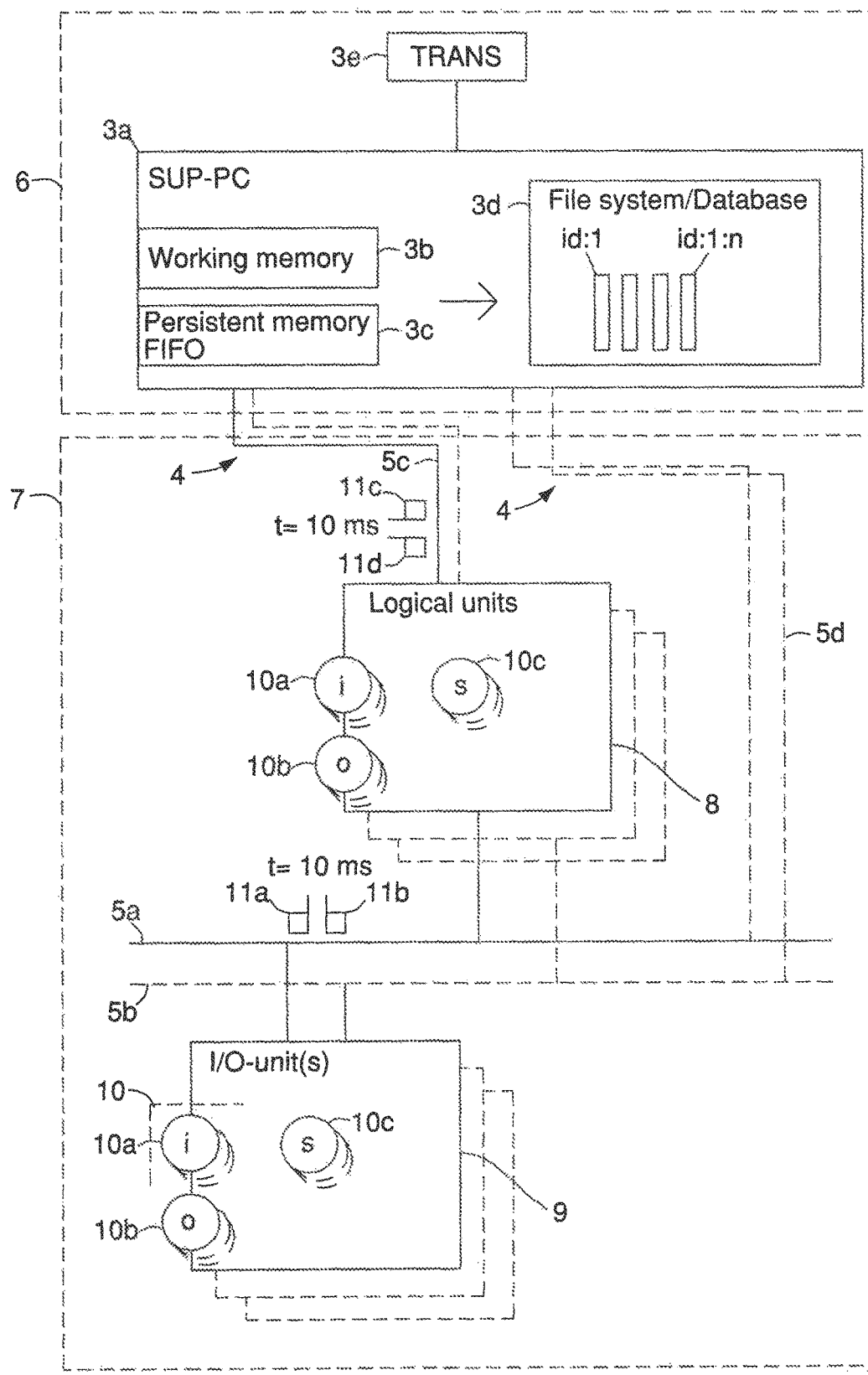
FIG. 2 shows schematically an example of a typical configuration of a CAN bus-based control system, which is included in a work machine and which system is adapted to collection and buffering of I/O and logic signal data according to the present invention.

Also referring to FIG. 2, the monitoring system 1 moreover comprises a machine control level 7, in which elements that are coupled to various types of actuators, sensors etc. are located. The machine control level 7 can comprise one or more electronic units 8, which are in data-transmitting connection with the control bus $5a$, $5b$. One or more electronic units 8 can also be in data-transmitting connection with the communication bus $5c$. The units 8 function as primary nodes at machine control level 7 and are also referred to as machine control nodes 8 in the following. A primary node 8 may for example comprise a microprocessor-based machine control computer MC-PC or a programmable logic controller (PLC) with input and output ports for connections to and from actuators, sensors 9 or other elements in the hardware of the work machine 1.

As most clearly appears from FIG. 2, on board the work machine $1a$ there will be a working memory and/or a persistent memory $3b$, $3c$ connected to the computer $3a$ and a file system $3d$, i.e. in practice a queue memory or storage space, which can be used for temporarily storing data and an associated FIFO buffer $3c$ (First In First Out) and alternately in a queue buffer data flows.

Said buffer may be of the type that has variable size of byte selected depending on the need for memory capacity. A default value of a suitable buffer size can comprise the memory capacity required to be able to receive a certain amount of signal data during a pre-set time unit, for example about 10-20 minutes of high-resolution signal data, whereby about 15 minutes of high-resolution data may be preferable for a work machine. Buffer $3b$ and FIFO $3c$ may be constructed so that older signal data are overwritten by newer data when the selected buffer size is no longer sufficient. Buffer 3b and FIFO 3c can thus reduce "n" number of data files id1:1-id1:n by a pre-determined size in byte in a non-volatile data support memory 3d, for example a hard disk, located on board the work machine. In this manner, the required signal data will be available in a database 3d for review when needed, for example in error search.

Figure 3:
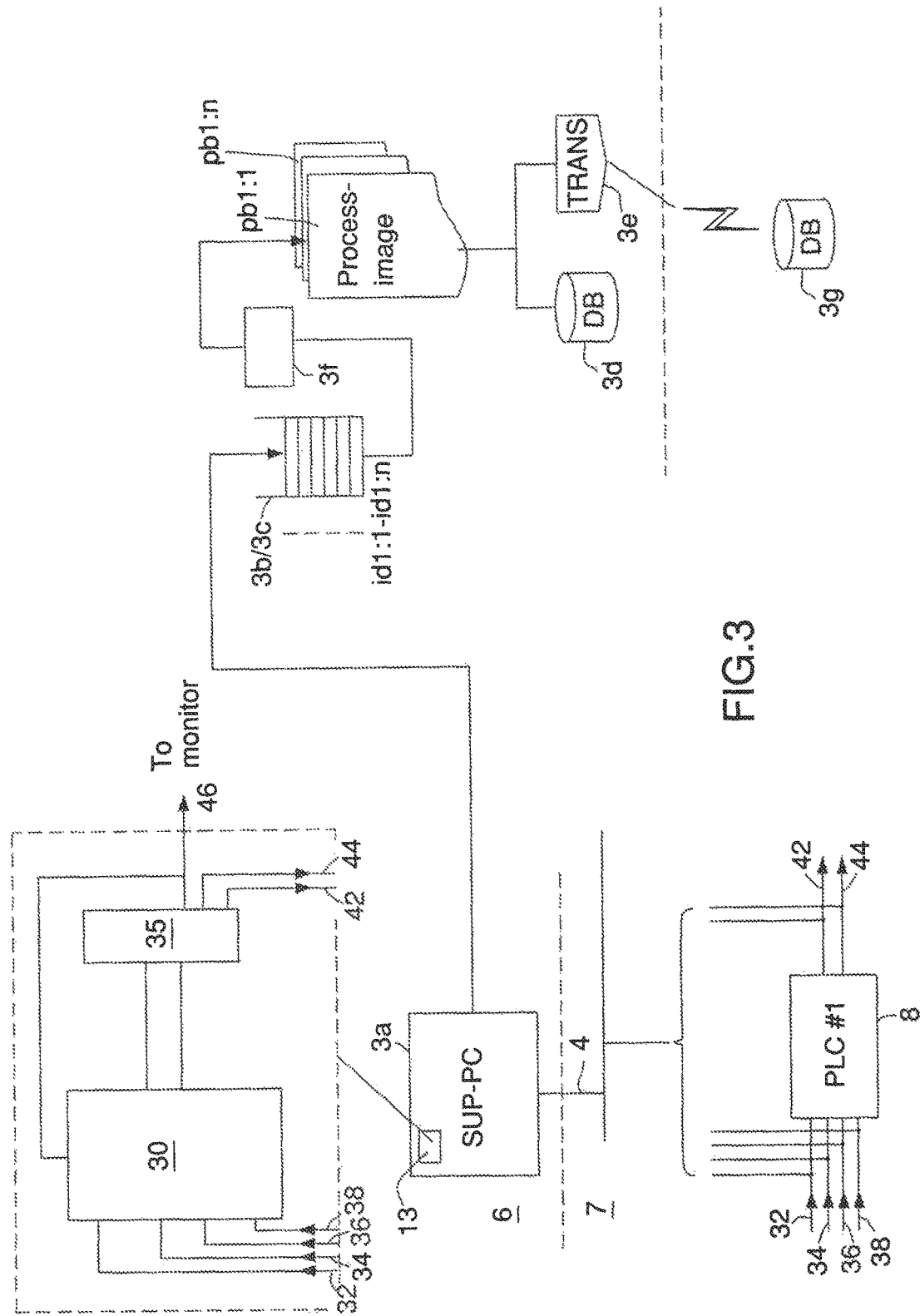
FIG. 3 shows a flow diagram, which schematically illustrates how a diagnosing and/or forecasting method can work, which is comprised in a monitoring system according to the invention.

As will appear from FIG. 3, each data file id1:1-id1:n correspondingly provides a process image pb:1-pb1:n, consisting of signal data recorded during a pre-set time interval. By means of a so-called logging means 3f, which is located at the exit of the FIFO step 3b/3c, a unique so-called log storage function, for example in the form of a timing marker by means of a clock, can be assigned to each initiated data file and hence also to the respective process images. Hereby the successively following process images pb:1-pb1:n can be arranged in a ordered and simple searchable manner in the non-volatile data support memory 3d on board the work machine 1a, alternatively via telecommunication 3e TRANS in a non-volatile data support memory 3e located at a distance, such as a hard disk or database.

Each process image pb:1-pb1:n thus provides an exact image of the state of the control system 1 during a specific time interval. The signal data id1:1-id1:n, which create said process images and are saved in the non-volatile data support memory 3d on board the work machine 1a, alternatively in the non-volatile memory 3f located at a distance, can subsequently be cleared at regular intervals, for example on a weekly basis, when the data are no longer considered to be necessary.

Again, with reference to FIG. 2 and as mentioned initially, all nodes in a CAN network function as master. The message is transferred by means of "identifiers". At a given point in time, several nodes can transfer data to the control bus 5a, 5b. The message code subsequently helps define the prioritization of the messages. Unlike a CAN bus, a LIN bus operates with master-slave topology. Typically, a network can comprise a master 10 with up to 16 slaves. All communication is initiated by the main node (master). As described initially, it forms the basis for this invention not just to log error codes that are outputted by individual primary control units (primary nodes 8) connected to the control bus 5a, 5b, but also to collect and record a digital flow of all relevant I/O data, i.e. in-parameters and out-parameters from both ECU primary control units (primary nodes 8), to secondary control units (secondary nodes 9), i.e. the simpler sensors, sensing elements and actuators, which may occur in a control system. Not least, data that contain information about the internal state 10c of software in primary and/or secondary nodes 8, 9 may be of interest.

For this purpose, the machine control level 7 comprises a master unit 10 and a plurality of slave units 10a, 10b belonging to the master to be able to sample measurement data (sampling measurements) and send these measurement data to the master unit 10. Denoted 10c, such a unit's software-internal state/data may also be sampled and sent in a corresponding manner. The master unit 10 and the slave units 10a, 10b are communicatively interconnected by means of serial buses, wherein each slave unit is configured to send measurement data to the master unit by said serial buses. The master unit 10 is configured to collect measurement data, and the system is arranged, via a suitable interface from secondary nodes 9, to communicate with the control bus 5a, 5b at network level by cyclically at pre-set time intervals of for example t=10 ms to send series of successive I/O or data packets 11a, 11b to the control bus.

It could be mentioned that the prior art within the field also makes it possible, as an alternative to establish communication between the master unit 10 and the control bus 5a, 5b at network level with any technique that offers wireless channels for short-range data communication, such as ZigBee or Bluetooth, whereby the data packets 11a, 11b from the master 10 is sent wirelessly.

An advantage of distributing signal data I/O in this manner, via data packets, via said master 10 and slave node 10a, 10b is that the slave nodes thus can report their I/O (value and status) to the central control system logic. In this way, the I/O data collected by the slave nodes in the form of in-parameters and out-parameters can be integrated in the signal recording data via the control bus 5a, 5b and further via the data transfer interface 5c, 5d to the computer 3a.

It should be understood that the monitoring system 1 described above is only exemplary and that such a system in practice usually comprises substantially more units which by way of a master-slave combination function as nodes in the control bus 5a, 5b. Add to this a significant number of I/O units, actuators, sensors and other elements, which are correspondingly required for a work machine 1a to function in the intended way and from which units signal data in the form of in-parameters and out-parameters can be recorded. From each primary node 8, cyclically and a pre-set time interval of for example t=10 ms, series of successive data packets 11c, 11d are sent to the computer 3a via a communication interface 4, which can comprise a communication bus, for example Ethernet 5c or a direct coupling 5d.

FIG. 3 illustrates how the monitoring unit 3 is installed with a data transfer interface 4 for communication with the control bus 5a, 5b. The data transfer interface 4 can comprise the communication buses mentioned above, for example in the form of Ethernet 5c or via direct coupling 5d.

In the FIFO buffer 3b, 3c, a queue of data flows are alternately sampled and stored, successively creating a respective data file id1:1-id1:n of optional size, but where each data file conveniently can comprise about 15 minutes of high-solution signal data. Each data file id1:1-id1:n comprises information about signals at the current primary and secondary nodes 8, 9 and thus constitutes a kind of process image pb:1-pb1:n, i.e. an exact reflection of a process state of the work machine 1a in a specific moment or time interval.

As mentioned above, the signal data that are saved in the non-volatile data support memory 3d on board the work machine 1a are cleared at regular intervals, for example on a weekly basis, when the data no longer are considered necessary. Signal data id1:1-id1:n can again be saved in local DB on board or be sent wirelessly via telecommunication 3e TRANS, for example via the internet to a data cloud, another node or a back-up station to be stored in an external non-volatile data support memory 3g located outside the work machine 1a, such as a hard disk.

As mentioned above, each data file id1:1-id1:n creates a process image pb:1-pb1:n, comprising information about signals from the work machine 1a. According to the invention, said sampled signal data id1:1-id1:n essentially comprise all data, i.e. both in-parameters and out-parameters from a plurality of nodes constituent in the control system 1. Overall, with both I/O and logic signals, it can for a more advanced work machine, such as a forest machine, be in the order of 1,000-5,000 signals, which are recorded momentarily in real time and thus every moment.

FIG. 3 schematically shows how a diagnostic and a prognostic system 13 in the form of an application or a program in the computer 3a SUP-PC on board can work together with the work machine's 1a monitoring system 1 at machine control level 7.

As appears, a PLC unit or similar primary node 8 at machine control level 7 can comprise a plurality of in-parameters and out-parameters. For example, said PLC unit 8 can include a number of in-parameters 32, 34, 36, 38. The in-parameter 32 can correspond to the press of a button detected by the PLC, the in-parameters 34, and 36 can correspond to a first respectively a second of the angular positions detected by angle sensors and 38 can correspond to a pedal indication. The PLC unit can correspondingly include out-parameters 42 and 44. The out-parameter 42 can correspond to a control signal for a valve setting, and the out-parameter 44 can correspond to a control signal for the start of a hydraulic engine. Even though only four in-parameters and two out-parameters in the exemplary object are shown in FIG. 3, it should be understood that an arbitrary number of in-parameters respectively out-parameters can be used. During operation, as soon as the PLC unit or any other primary node 8 at machine control level 7 is provided with the value of the in-parameters, the primary node (the PLC unit) can generate corresponding values of the out-parameters by means of integrated control logic and pre-set algorithms to control any type of function of the work machine 1a.

The diagnostic and prognostic system 13 at monitoring level 3 can correspondingly not just monitor the operation of any individual unit or node that is comprised in the control system 1, but also, according to the invention, "unconditionally" monitor, i.e. record signals to and from each unit or primary/secondary node in the control system in order to in this way make it possible to efficiently diagnose and/or predict errors in the operation of the work machine 1a.

The diagnostic and prognostic system 13 can include a diagnostic model 30 and a logic module 35. The diagnostic model 30 can reflect the relationship between in-parameters and out-parameters to a primary node, the PLC unit 8.

In this regard, it may be relevant to compare operating data in model 30 and logic module 35, which data are essential for a state, with reference data from a database according to a pre-determined criterion. Reference data may thus consist of data, which are collected in a corresponding way as described above for the same or a corresponding work machine 1a at different times. The result from a diagnostic process and/or a prognostic process can be retrieved via an output port 46 for further communication, for example for presentation for drivers on the computer's 3 monitor 3a.

As another alternative an analytical tool can be used in said model 30 and logic module 35 in such a way that it compares operating data from said process images pb:1-pb1:n with nominal values, i.e. pre-set standard values. When a signal in a process image pb:1-pb1:n deviates from the nominal value, the node, i.e. device or unit from which the signal stems, is considered to be erroneous.

In case of detected deviations, an "error report" in real time can be shown to the driver on a monitor in the driver's cabin 1b. Error reports can also be sent to relevant receivers for analysis, for example machine manufacturers. An "error report" can be sent manually by for example the driver through telecommunication TRANS 3e. Other essential information can be added to the error report, such as information about the work machine in question, i.e. identification about the individual machine, for example in the form of the machine manufacturer's serial number. Geographical data such as location information may possibly be added to the error message.

In an alternative embodiment, it is worth considering that the "error report" can be sent automatically by the work machine's 1a control system 1 in case the control system 1 at monitoring level 6 detects an error. To save space, each signal buffer or thereby data file id1:1-id1:n of process images pb1:1-pb1:n can be saved automatically and be sent as a ZIP file together with other error search data from the work machine 1a. Said data can also comprise operating data, i.e. production or process data and hence data, which are separated from the work machine's 1a specific machine control functions. Said production or process data can comprise certain machine settings, production data and various types of logs from the computer 3a on board.

The present invention is not limited to the description above and what is shown in the drawings, but can be amended and modified in a number of different ways within the framework of the intention of the inventive idea set forth in the following claims.

The invention claimed is:

1. A method for monitoring a control system of a work machine, which method comprises the following steps;
    that a plurality of in-parameters in the form of signals are obtained from the control system, whereby the control system generates actual values on one or more out-parameters in the form of signals based on said plurality of in-parameters, comprising the steps:
    collecting a digital flow of operating and measurement data, comprising both said in-parameters and out-parameters, in real time from the control system;
    addressing the digital flow of operating and measurement data, via a control bus constituent in the control system and a communication interface connected to this, to a data area in a working memory or persistent memory included in a personal computer on board the work machine,
    periodically saving a data file corresponding to the data area in a non-volatile data support memory on board the work machine or transferring via telecommunication and saving in an external non-volatile data support memory,
    creating a process image which provides an image of the state of the control system during a specific time interval which is created by assigning each saved data file a unique log storage function,
    comparing operating data from the process image with nominal values in an analytical tool to detect deviations and when data in the process image deviates from the nominal value then a node in the form of a device or unit from which the deviating data in the process image derives is considered as incorrect, and if incorrect, generating an error report for each detected deviation,
    wherein at least one of the following process steps is performed
    a) displaying the error report in real time to a driver on a monitor in a cab included in the work machine;
    b) sending the error report via a telecommunication system to a receiver for analysis;
    c) adding the error report to other essential information before sending the error report via the telecommunication system to the receiver for analysis in which said information may include any of the following;
    c1) information about the current work machine;
    c2) geographical data such as location information.

2. The method according to claim 1, whereby a RAM buffer memory is used as data area in the working memory, which in FIFO mode writes a data file of a pre-determined size composed of a flow of incoming new operating and measurement data, which overwrite the operating and measurement data in an equivalently created older data file in said buffer; and that a copy of the created data file, which is contained in said RAM buffer memory is saved in the non-volatile data support memory on board the work machine or via the telecommunication system transferred and saved in the external non-volatile data support memory.

3. The method according to claim 1, whereby a communication bus is used as communication interface between the control bus and the computer.

4. The method according to claim 1, whereby in addition to the digital flow of operating and measurement data of in-parameters and out-parameters, the software-internal state/data are retrieved from a combination of primary nodes as well as secondary nodes that are comprised in the control system.

5. The method according to claim 1, whereby the digital flow of operating and measurement data of in-parameters and out-parameters comprises signals which are collected in real time and recorded from a combination of primary nodes as well as secondary nodes in the control system.

6. The method according to claim 1, whereby, in the control system, a master is used, connected to one or a plurality of slaves, included in secondary nodes, communicates with the personal computer by cyclically, at a pre-set time interval, sending series of successive I/O or data packets.

7. The method according to claim 6, whereby data packets are sent from the master in the control system externally via a kind of a wireless channel for short-range data communication.

8. The A method according to claim 1, whereby the unique log storage function comprises a timing marker which by means of a clock, is assigned to each initiated data file via a logging means.

9. The method according to claim 1, whereby any deviation for corresponding signals between at least one of said in-parameters or out-parameters is compared and identified relative to a previously and subsequently created data file.

10. The method according to claim 9, whereby the required bandwidth is reduced by addressing only signals that have changed according to the comparison to the computer from the control bus.

11. The method according to claim 5, whereby the relationship between the collected and recorded in-parameters, out-parameters is reflected by a diagnostic model with an associated logic module.

12. The method according to claim 11, whereby the diagnostic model and the logic module used are constituted by a computer program or an application, which is installed on the computer (3a) on board.

13. The method according to claim 1, whereby the personal computer on board is used for the combined handling of operating production or process data processing for the work machine as well as recording and buffering of the digital flow of operating and measurement data, comprising said in-parameters and out-parameters from the control system.

14. A work machine, particularly a forest machine, comprising
a control system with a machine control level,
a monitoring system with a monitoring level,
one or more control buses,
one or a plurality of primary and secondary nodes, configured to manage and control functions of the work machine by using actual values on the out-parameters based on a plurality of in-parameters,
wherein the monitoring system on said monitoring level comprises,
a computer such as a PC with capacity to store data,
an interface by which the computer is in transmitting connection via said one or more control buses,
a working memory,
a non-volatile data support memory,
wherein a digital flow of operating and measurement data, comprising said in-parameters as well as out-parameters from the primary and secondary nodes is periodically addressed to a buffer in the working memory, which in FIFO mode creates a data file of a pre-determined size comprised by a flow of incoming new data, which overwrite data in an equivalently created older data file in said buffer, and
that a copy of the created data file contained in said working memory is saved in a non-volatile data support memory,
an analytical tool in which the operating data from a process image is compared with nominal values to detect deviations, in which a node in the form of a device or unit is considered incorrect when the data in the process image derived from the node deviates from the nominal value, and in which an error report is generated for each detected deviation that is incorrect, wherein the process image comprises an image of the state of the control system during a specific time interval created by assigning each data file a log storage function,
wherein the work machine further comprises at least one of the following:
a) a driver's cab comprising a monitor on which the error report is displayed to a driver in real time,
b) a telecommunication system with which the error report can be sent to a suitable receiver for analysis,
c) a system by which other essential information can be added to the error report before the error report is sent by the telecommunication system to the suitable receiver for analysis, which information may include at least one of the following;
c1) information about the current work machine;
c2) geographical data such as location information.

15. The work machine according to claim 14, wherein the interface for data communication between the computer and the control bus comprises a dedicated communication bus.

16. The work machine according to claim 14, wherein the computer's working memory comprises a RAM buffer memory and associated FIFO unit and the digital flow of in-parameters and out-parameters is addressed to said RAM buffer memory so that the FIFO mode creates the said data file.

17. The work machine according claim 14, wherein the computer is located on board the work machine.

18. The work machine according to claim 14, wherein the non-volatile data support memory is located on board the work machine.

19. The work machine according to claim 14, comprising a means, which makes it possible, via telecommunication, to transfer created data files from the work machine, for example for storage in an external non-volatile data support memory.

20. The work machine according to claim 14, wherein the personal computer on board comprises a computer program or applications that make it possible to combine handling and storage of operating production or process data processing for the work machine as well as recording and buffering of digital flows of signal data, comprising said in-parameters and out-parameters from the control system.

* * * * *